July 17, 1956
S. G. TILDEN
2,754,798
COATER DEVICE FOR APPLYING AN ADHESIVE AGENT
IN VISCOUS FLUID FORM TO SEGMENTS OF
BRAKE LINING FRICTION MATERIAL
Filed June 8, 1953
5 Sheets-Sheet 1
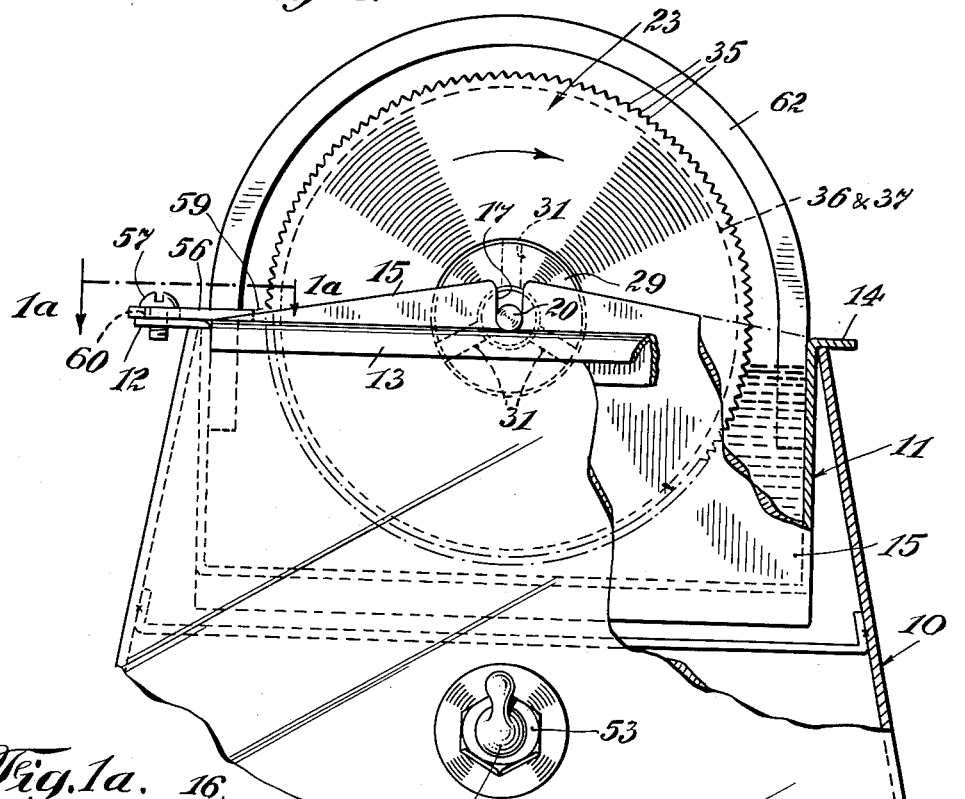
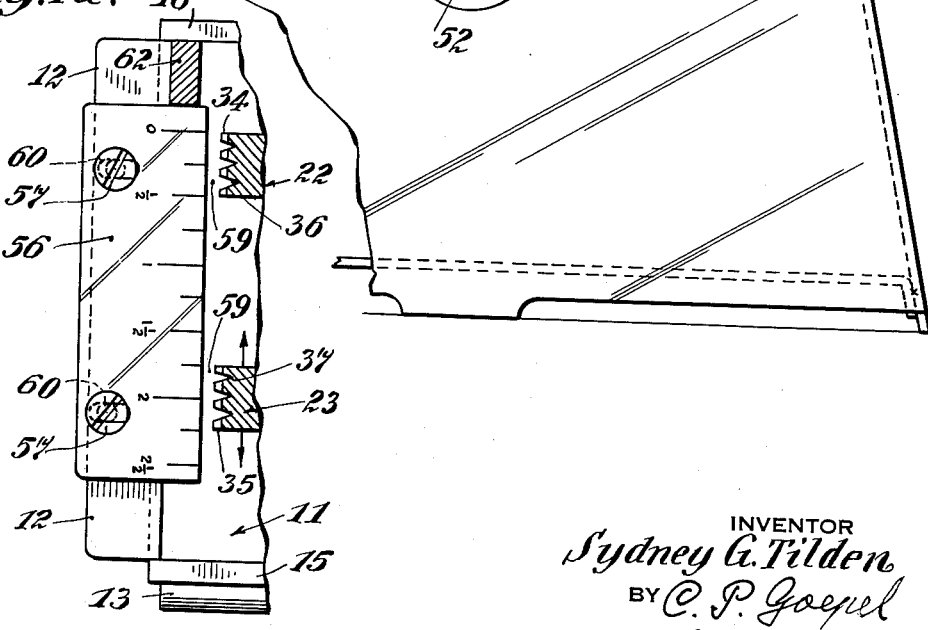
INVENTOR
*Sydney G. Tilden*
BY *C. P. Goepel*
his ATTORNEY

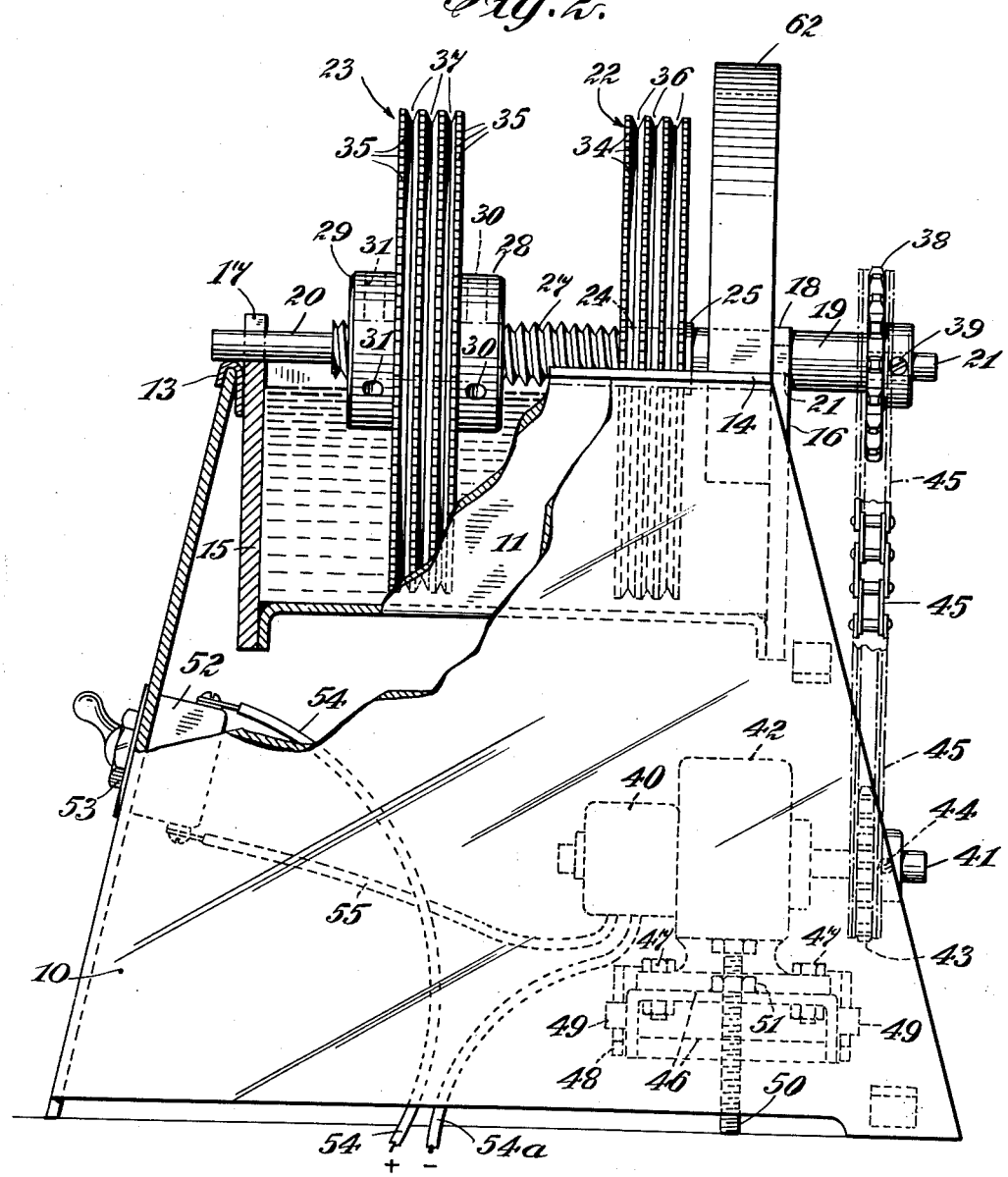

July 17, 1956

S. G. TILDEN 2,754,798

COATER DEVICE FOR APPLYING AN ADHESIVE AGENT
IN VISCOUS FLUID FORM TO SEGMENTS OF
BRAKE LINING FRICTION MATERIAL

Filed June 8, 1953

INVENTOR
Sydney G. Tilden
BY C. P. Goepel
his ATTORNEY

July 17, 1956 S. G. TILDEN 2,754,798
COATER DEVICE FOR APPLYING AN ADHESIVE AGENT
IN VISCOUS FLUID FORM TO SEGMENTS OF
BRAKE LINING FRICTION MATERIAL
Filed June 8, 1953 5 Sheets-Sheet 4
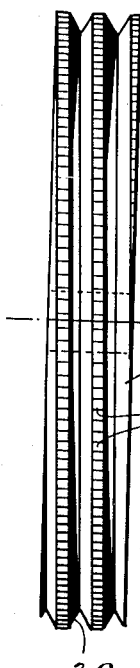
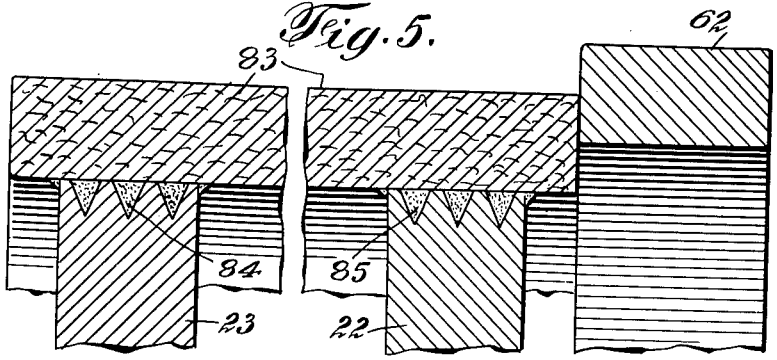
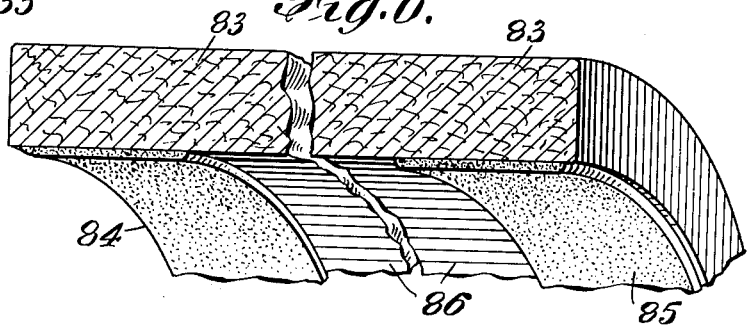
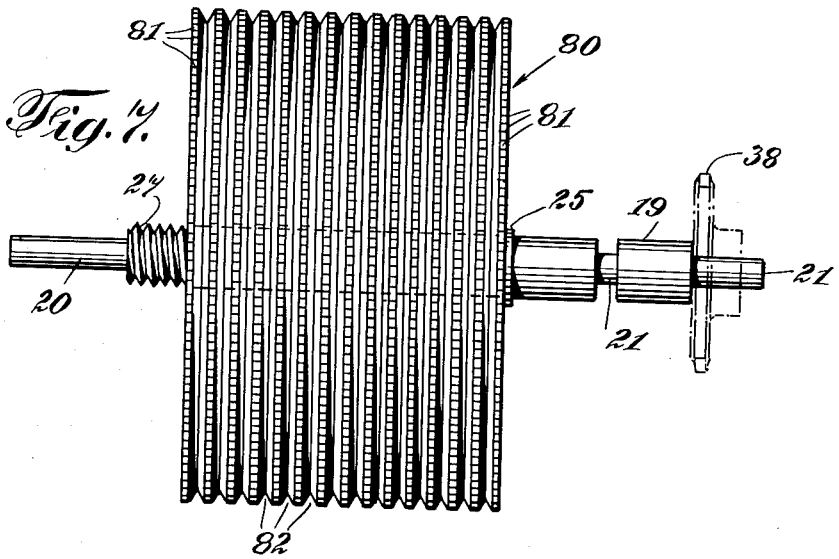
INVENTOR
Sydney G. Tilden
BY C. P. Goepel
his ATTORNEY July 17, 1956
S. G. TILDEN
2,754,798
COATER DEVICE FOR APPLYING AN ADHESIVE AGENT IN VISCOUS FLUID FORM TO SEGMENTS OF BRAKE LINING FRICTION MATERIAL
Filed June 8, 1953
5 Sheets-Sheet 5
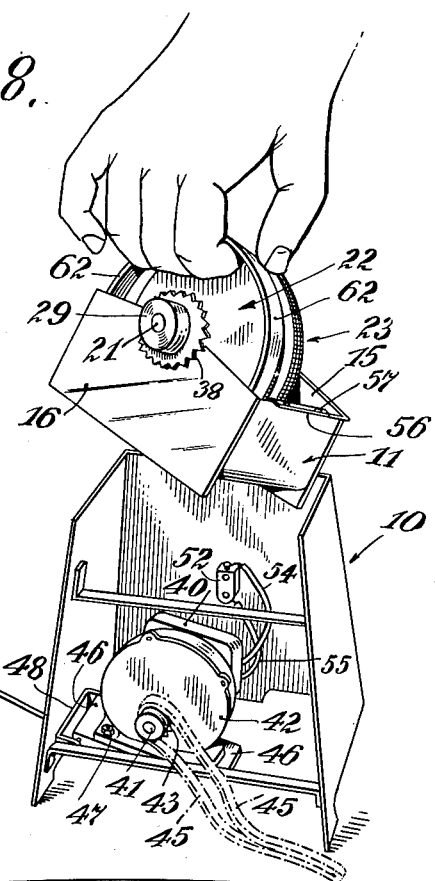
INVENTOR
Sydney G. Tilden
BY C. P. Goepel
his ATTORNEY United States Patent Office 2,754,798
Patented July 17, 1956

2,754,798

COATER DEVICE FOR APPLYING AN ADHESIVE AGENT IN VISCOUS FLUID FORM TO SEGMENTS OF BRAKE LINING FRICTION MATERIAL

Sydney G. Tilden, Glen Cove, N. Y., assignor to The Permafuse Corp., Westbury, N. Y., a corporation of New York Application June 8, 1953, Serial No. 360,094

3 Claims. (Cl. 118—252)

This invention relates to a coater device for applying an adhesive agent in viscous fluid form to segments of brake lining friction material, and to the surface of metallic brake shoes, prior to the attachment of the friction material to the brake shoe by means of curing the adhesive under heat and pressure, otherwise known to the trade as bonding.

The art of bonding brake lining friction material to brake shoes, instead of attachment by means of mechanical rivets, has progressed to the point that almost one-half of the passenger cars produced in 1952 had bonded brake segments. Such production requires a device to apply the adhesive to the surface of the brake lining friction material, and also to the faying surface of the brake shoe where this is necessary or advisable, which will apply the correct amount of adhesive and which also is fast in operation, cheap to operate, economical to purchase, and simple to clean. The previous use of a brush, spatula or spray gun as a means of application is now too slow and too costly beside being erratic in the control of the amount of adhesive applied.

Various coater devices have been built in the past but all have been either too costly to manufacture, too difficult and too slow to operate, and so time consuming to clean after use that intermittent use of the coating device has been impractical. In my device I have invented a means of applying the adhesive agent to the surface of the friction material segments which overcomes the objections to the apparatus of the prior art, which is simple and inexpensive to manufacture, easy and fast to operate, and which applies a uniformly even coating of correct thickness and which, by its unique construction, is very simple to clean after each use.

In the accompanying drawing:

Fig. 1 is a front view in partial section of my coater device.

Fig. 1a is a partial section along line 1a—1a in Fig. 1, as viewed in the direction of arrows.

Fig. 2 is a side view in partial section of my coater device.

Fig. 4 is a detail view showing an alternate design of coater roller circumferential grooves.

Fig. 5 is a detail view, showing a segment of brake lining friction material in contact with the coater rollers and guide means.

Fig. 6 is a section showing a segment with strips of adhesive agent applied.

Fig. 7 is a detail view, showing an alternate design employing a single coater roller.

Fig. 8 is a perspective view, showing the coater pan and roller assembly being removed from stand for cleaning.

Fig. 9 is a detail view of the action between the roller and a segment of brake lining friction material.

Fig. 10 is a detail in section showing the action of the adhesive material in the circumferential grooves.

Fig. 11 is a detail in section showing a deposit of the adhesive agent on a segment of brake lining friction material from the circumferential grooves.

Similar characters of reference indicate corresponding parts throughout the various views.

Figure 3:
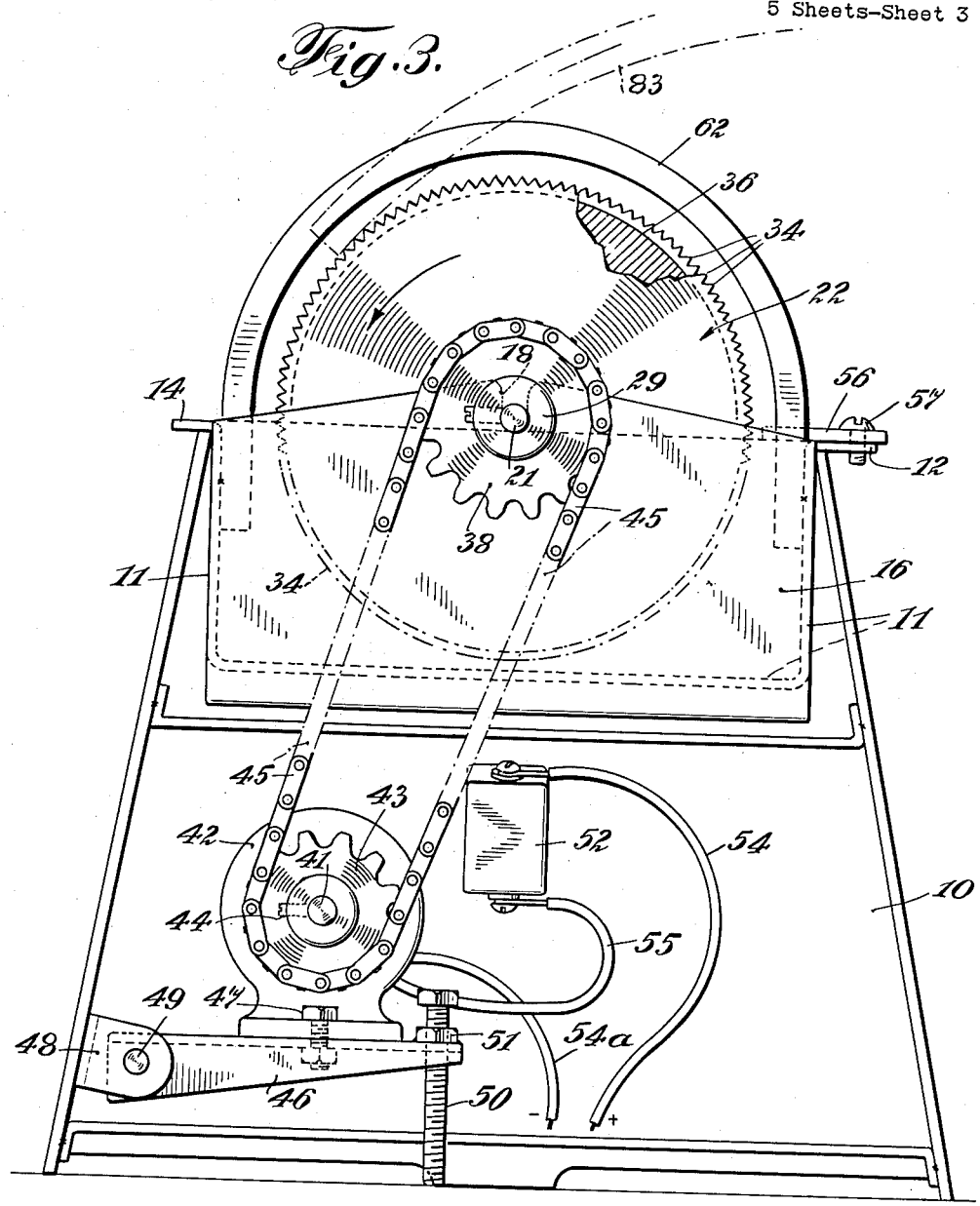
Fig. 3 is a rear view in partial section of my coater device, showing the roller drive mechanism.

Referring to the drawings and more particularly to Figs. 1, 2 and 3, I provide a stand 10 formed of sheet steel of preferably 10 gauge thickness having a front and two sides, with the back open.

Pan container 11, also formed of sheet steel of preferably 20 gauge thickness, fits inside the top of stand 10 and has lips 12, 13 and 14 which extend over the edges of the three sides of metal stand 10 to hold the pan 11 in position. Pan container ends 15 and 16 are formed of heavier sheet steel of approximately 1/8" thickness and are equipped with slots 17 and 18. Shaft 19 has reduced diameter portions 20 and 21 which fit into the slots 17 and 18 and position the shaft 19 with respect to the pan container 11, the portions 20 and 21 of the shaft 19 acting as journals and the slots 17 and 18 acting as bearings when the shaft 19 is rotated.

Coater rollers 22 and 23 are mounted on the shaft 19, roller 22 being a press fit on portion 24 of shaft 19 and seating against the retaining ring 25. Portion 27 of shaft 19 is threaded and nuts 28 and 29 engage threads 27 on either side of coater roller 23, which is a free fit of the threaded portion 27. Nuts 28 and 29 have a cylindrical outer surface with holes 30 and 31 adapted to receive a round rod to serve as a wrench in turning and locking the nuts 28 and 29 against roller 23.

The outer periphery of the coater rollers 22 and 23 have a plurality of small V shaped grooves 34 and 35 which run across the peripheral cylindrical surface of the rollers, from edge to edge, parallel with their axis and a plurality of larger V shaped grooves 36 and 37 which run parallel with each other circumferentially around the peripheral cylindrical surface of the rollers and spaced from edge to edge normal to their axis. At one end of the shaft 19 is a driven sprocket 38, attached to the shaft 19 by means of set screw 39.

A synchronous electric motor 40, of the type employing permanent field magnets, has an armature speed of 3600 R. P. M. operating on 60 cycle alternating current which is reduced to 100 R. P. M. of the output shaft 41 by means of gear reducer 42. To the output shaft 41 is attached drive sprocket 43 by means of set screw 44. Chain 45 connects sprockets 38 and 43.

The motor 40 and gear reducer 22 are mounted on platform 46 by means of screws 47 and platform 46 is mounted on the stand 10 by means of bracket 48 spot welded or otherwise attached to stand 10 and pin 49, and supported at the other end by threaded leg 50 adjustable as to height by turning in the nut 51 attached to platform 46. The motor 40 is thus free to be moved upward in an arc having pin 49 as its center, forming a ready means of shortening the distance between sprockets 38 and 43 for removal and replacement of chain 45. Switch 52 is mounted on stand 10 and is held in position by nut 53 as is common practice in the art. Lead wires 54 and 54a are connected to a source of 115 volt alternating current (not shown) and lead wire 55 runs from the switch 52 to the motor 40.

A guide 62, of approximately semi-circular form and spaced concentrically with respect to roller 22 and away from the outside edge of roller 22 approximately 1/8", radially and axially, is spot welded or otherwise attached to pan container 11 and serves to position a brake lining friction material segment 83 edgewise of the coater rollers 22 and 23, as shown more particularly in Fig. 5. Since adjustment for various widths of segments is made by moving roller 23 axially on shaft 19 by means of adjusting nuts 28 and 29, coater roller 22, being fixed on shaft 19, is always in the same position with respect to pan container 11 and the fixed position guide 62, attached to pan container 11, is always in the same position with respect to roller 22. Thus the segment of brake lining friction material 83, held against the fixed position guide 62, will contact roller 22 approximately 1/8" in from its far edge and roller 23 may be adjusted to contact the segment approximately 1/8" in from its near edge. It has been found that the 1/8" spacing between the edge of the coater rollers and the edge of the segment is desirable since it affords an area into which the adhesive agent may flow as it dries and subsequently cures and eliminates any flow of adhesive agent exterior of the segment and brake shoe in the final cure.

A wiping blade or doctor 56 (Figs. 1 and 1a) is attached to pan container 11 by means of screws 57 and adjustment of the distance 59 between the peripheral cylindrical surface of the coater rollers 22 and 23 and the wiping edge of doctor 56 is provided by means of the elongated screw slots 60. By moving the doctor 56 toward or away from the rollers 22 and 23 the amount of adhesive agent carried out of the pan container 11 on the peripheral cylindrical surface of the rollers may be limited and controlled. I have found that a spacing of approximately 1/16" between the wiping edge of the doctor 56 and the surface of the rollers 22 and 23 permits the correct deposit of adhesive agent on the segment if the viscosity of the adhesive agent is held within proper limits, as specified elsewhere in this application. Doctor 56 also has scale markings on its top surface providing for ready positioning of the coater roller 23 axially with respect to the coater roller 22.

It has been found advantageous to apply adhesive agent in two strips 84 and 85 edgewise of the segment 83 as shown in Fig. 6, and to bond such segments to brake shoes at these edge portions only, leaving the central portion 86 unattached to the shoe. Such practice permits the segment to flex slightly radially toward the shoe at the center portion 86 under braking force and serves to provide a cushion which improves brake performance and reduces brake squeak. Furthermore this practice permits the adhesive agent employed to flow, under the heat and pressure employed in curing, to the inside edges as well as the outside edges and is of great benefit in permitting the escape of volatile solvents and gases released from the adhesive during the cure. For these reasons I prefer to employ two coating wheels as disclosed, adjustable as to their distance apart to fit the width of the particular brake lining friction material segment being coated, which apply the adhesive in two strips along the edges of the segment. Since the segments employed on recent production cars vary in width from 1¾" to 2½" the coater roller 23 may be positioned within this range by rotating the nuts 28 and 29 clockwise or counterclockwise which position is indicated by the relationship of the outside edge of the wheel 23 to the scale markings on doctor 56. It is highly desirable that changes in the spacing between the two coater wheels to accommodate segments of a different width, be made quickly and without emptying the adhesive agent from pan 11 since in use, the operator may have to coat a run of say 100 segments 1¾" wide, then coat a run of say 100 segments 2" wide, then a run of say 100 segments 2¼" wide and finally a run of say 100 segments 2½" wide. In the coater device of this invention, it is not necessary that the pan container be emptied to change the roller spacing for a different width segment. By inserting rods in the holes 30 and 31 of nuts 28 and 29, the nuts may be loosened and turned even though partially emersed in the adhesive agent, the wheel 23 positioned by reference to the scale markings on doctor 56, the nuts tightened and roler 23 locked to shaft 19.

Thes operation is as follows:

In coating brake lining friction material segments with my improved device, pan 11 is filled with the particular adhesive material employed to a level just below the surface of shaft 19. The motor 40 is started by turning on switch 52 and shaft 19 and coater rollers 22 and 23 are rotated clockwise (Fig. 1) by means of chain 45 and sprockets 38 and 43. The brake lining friction material segment 83 is placed by hand with its back edge in contact with the fixed guide 62 and its right end ready to contact the coating rollers 22 and 23. With a slight finger pressure exerted downward and away, the segment is allowed to pass over the rotating rollers from left to right, and is picked off the rollers when the left end of the segment is reached, keeping a continuous pressure on the segment holding it against the rollers 22 and 23 and against the fixed guide 62. Referring to Fig. 9, as the segment passes over the surface of the rollers, the pointed apex portions 93 of the grooves 34 and 35 contact the surface of the segment 83 and act to drive the segment in the same direction as the motion of the wheels, viz: left to right. Portions 96 of the adhesive agent 95 picked up in the grooves 34 and 35 as they pass through the pan 11 are deposited on the surface of segment 83 and remain, after contact with the roller is lost, by capillary attraction, as shown in Fig. 9. However, only a portion of the adhesive in the grooves 34 and 35 is transferred from the rollers 22 and 23 to the segment surface, the remaining portions 94 being retained in the bottom of the grooves 34 and 35. Should there be any slippage between surface rollers 22 and 23 and the segment 83, the action of the pointed apex portions 93 would be to wipe off the deposited portions 96. Since the segment 83 is fed across the rollers 22 and 23 by hand, it is virtually impossible to match the exact speed of the roller surface and some slippage is to be expected.

For this reason I have provided also the much larger circumferential grooves 36 and 37 which are filled with the adhesive agent when in the pan 11 and carry the adhesive up as the rollers rotate, the rotational speed of rollers 22 and 23 being set by means of motor speed, gear reducer and relative sprocket size, so that the peripheral speed of rollers 22 and 23 is faster than the rundown of the adhesive under the force of gravity. Thus, as shown in Fig. 10, the adhesive 97 is carried upward in the circumferential groves 36 and 37 and, upon contacting the surface of the brake lining friction material segment 83, as shown in Fig. 11, a large portion 98 of the adhesive agent is transferred to the surface of the segment and retained by capillary attraction in a continuous strip, much as a ruling pen holds ink between its side surfaces and transfers the ink to paper as the pen is drawn across. Grooves 36 and 37 being V shaped in cross section provide a maximum surface contact between adhesive material and the segment for the volume of adhesive material in the grooves and which results in the transfer of a maximum amount of adhesive material from the coater rollers to the segment surface as shown in Figs. 10 and 11. Any slippage between segment 83 and the coater rollers 22 and 23 will not result in a wiping off of the portion 98 of the adhesive deposited from the circumferential grooves 36 and 37 in contrast to the wiping action on the portions 96 deposited from the transverse grooves 34 and 35 and thus by employing small transverse grooves 34 and 35 and large circumferential grooves 36 and 37 the coating device may be operated by an inexperienced operator with quite uniform results.

The nature of the adhesive agent preferably employed is such that the portions deposited will flow together before drying to form two continuous strips of adhesive of substantially uniform thickness, as shown by 84 and 85 in Fig. 6.

Instead of a plurality of parallel circumferenial V shaped grooves in the peripheral cylindrical surfaces of the rollers, a single continuous V shaped screw thread 36a (Fig. 4) may be substituted which performs the same function and is much easier and cheaper to produce. The plurality of parallel grooves requires either a special cutter to cut all grooves at once or a series of cuts must be made if a single cutter is employed. By contrast, the single continuous screw thread may be cut by a single cutter in one operation on a screw cutting lathe by adjusting the feed screw to advance the cutter the width of the thread employed for each revolution of the roller blank. Using this means, a number of roller blanks may be mounted on a single spindle and all of the circumferential grooves cut at one setting by merely cutting a screw thread across their peripheral cylindrical faces. The V shape grooves running across the face of the rollers parallel to their axis may also be cut on a number of roller blanks at the same setting by deep knurling across their peripheral cylindrical faces, the grooves running across the faces of the rollers being much shallower than the grooves running circumferentially around the faces.

The amount of adhesive agent picked up by coater wheels and deposited on the segment is a function of the viscosity of the adhesive agent, surface speed of the coater roller, clearance between the wiping edge of the doctor and the surface of the coater wheels, and the number, width and depth of both transverse and circumferential grooves cut in the coater wheel surface. However, I have found that the width and depth of the circumferential grooves most affects the deposit of adhesive agent and my device is unique in employing relatively large and deep circumferential grooves which serve to deposit the adhesive on the lining surface and small transverse grooves which serve to form the pointed portions 93 (Fig. 9) to drive the segment with the rollers.

The adhesive agent I have found best suited for use with my device is a modified phenol-formaldehyde resin base varnish in an alcoholacetone solution having a viscosity between 700–800 centipoise at 70° F. as manufactured and sold by The Permafuse Corp., Garden City, New York, under their designation WM–35. Other similar adhesives as manufactured and sold by the Bakelite Company, B. F. Goodrich Company and the Cycle-weld Division of the Chrysler Corp. may be used providing their viscosity is adjusted as necessary by the addition or removal of solvents to approximate the viscosity of Permafuse WM–35.

With an adhesive agent having the above viscosity I have found that a coater roller surface speed of 165 ft. per min., 1/16" clearance between the wiping edge of the doctor and the surface of the rollers, transverse grooves spaced 13 per inch having a width of 1/12" and a depth of .072" and circumferential grooves spaced 6 per inch, having a width of 1/8" and a depth of .108" will deposit .16 fluid ounce of adhesive agent on a segment 11" long in two strips each 5/8" wide which, after drying, results in an adhesive agent dry film thickness of between .006" and .008". This quantity of adhesive agent, and the resultant dry film thickness I consider the optimum for bonding a segment of brake lining friction material to a metallic brake shoe.

If it is desired to coat the entire back surface of a friction material segment with the adhesive agent, instead of applying two strips of adhesive agent at the edge portions only, a single coater roller 80 (Fig. 7) may be substituted for the two rollers 22 and 23. The single roller 80 is a press fit on shaft 19 and seats against the retainer ring 25. Nuts 28 and 29 of the previously described design are not employed. Roller 80 is made wide enough to accommodate the widest segment of friction material employed in passenger car production, viz. 2½". The peripheral cylindrical surface of roller 80 is of the same design as employed with rollers 22 and 23, and has a plurality of small V shaped grooves 81 which run across the surface of the roller 80 from edge to edge parallel with its axis, and a plurality of larger V shaped grooves 82 which run parallel with each other circumferentially around the surface of the roller 80, spaced from edge to edge normal to its axis. An alternate design, substituting a single continuous V shaped screw thread for the plurality of parallel V shaped grooves 82 as shown in Fig. 4, may also be employed.

With my improved coater device, it is also possible to apply a coating of adhesive agent to the faying surface of a metallic brake shoe whenever this is desirable. If shoes are to be coated, roller 23 is adjusted by means of nuts 28 and 29 to the proper spacing for the width of particular shoe to be coated, the motor 40 started, and the shoe fed in inverted position across the rotating rollers from left to right with its far edge in contact with fixed guide 62 in exactly the same manner as segments are coated. This feature of my coater is unique in that no other coater of known design is able to coat both friction material segments and metallic brake shoes without first making substantial changes in the guiding means and in the roller mechanism.

When it is desired to discontinue coating for the time being, it is important to remove any remaining adhesive agent and clean all parts having had contact with the adhesive, before it sets up and becomes virtually impossible to remove. With coating devices of the past, this has been a difficult and time consuming task, requiring disassembly of the individual working parts and washing in a suitable solvent or an equally time consuming and messy task of washing down the various parts of the device without disassembly. This precludes the intermittent use of coaters of the past art. Once coating is started, it has been mandatory that the coater be operated continuously and that the various segments to be coated be assembled and run through the coater before the machine is shut down. With the improved coating device, the shutdown operation becomes so simple that intermittent use of the coater is entirely practical. By swinging the motor 40 and its platform 46 upward, chain 45 may be readily disconnected from sprocket 38 and the pan container 11 including the adjustable doctor 56 and fixed guide 62, and rollers 22 and 23, shaft 19, nuts 28 and 29 and sprocket 38, may be lifted out of stand 10 as an assembly, the fixed guide 62 serving as a handle with all other parts enumerated remaining in places as shown in Fig. 8. The adhesive agent residue may then be poured out and the assembly placed in a container of solvent for storage until next use. When next use is required, the above units, as an assembly, may be removed from the solvent, the fixed guide 62 serving excellently as a handle, the solvent remaining in the pan container 11 poured out, the assembly replaced on the stand 10, the chain 45 placed around sprockets 38 and 43, the adhesive agent poured into the pan container 11 to the height before recommended, the motor 40 turned on and the rollers 22 and 23 allowed to rotate in the adhesive agent until thoroughly wetted.

While I have described several embodiments of my invention, I do not desire to be limited to the exact details thereof, but only by the scope of the appended claims.

I claim:

1. In a coater device for applying an adhesive agent in viscous fluid form to a segment of brake lining friction material, the combination of a pan container for holding said adhesive agent, a shaft rotatably supported by said container, a pair of rollers mounted on said shaft and rotatable within said pan container, means fixing one of said rollers to said shaft, means rotatably and axially movably supporting the other of said rollers on said shaft including screw thread means for changing the axial distance between said rollers, means for rotating said rollers at a constant speed, adjustable wiping means adjacent to the peripheral cylindrical surface of said rollers, and a stationary guide member adjacent said fixed roller, said rollers having a plurality of relatively shallow V-shaped grooves in said peripheral cylindrical surfaces thereof extending across said surfaces from edge to edge and in parallelism with the axes of said rollers, and a plurality of relatively deep V-shaped parallel grooves in said peripheral cylindrical surfaces spaced from edge to edge, extending circumferentially around and running normally to the axis of each of said rollers.

2. In a coater device for applying an adhesive agent in viscous fluid form to a segment of brake lining friction material, the combination of a pan container for holding said adhesive agent, a shaft rotatably supported by said container, a pair of rollers mounted on said shaft and rotatable within said pan container, means fixing one of said rollers to said shaft, means rotatably and axially movably supporting the other of said rollers on said shaft including screw thread means for changing the axial distance between said rollers, means for rotating said rollers at a constant speed, adjustable wiping means adjacent the peripheral cylindrical surfaces of said rollers, and a stationary guide member adjacent said fixed roller, said rollers having a plurality of relatively shallow V-shaped grooves in said peripheral cylindrical surfaces thereof extending across said surfaces from edge to edge and in parallelism with the axes of said rollers, and each of said rollers having a relatively deep V-shaped groove extending around said peripheral cylindrical surface in the form of a single screw thread and running continuously around from edge to edge of each of said rollers.

3. In a coater device for applying an adhesive agent in viscous fluid form to a segment of brake lining friction material, the combination of a frame, a pan container for holding said adhesive agent removably supported by said frame, an adjustable wiping blade member and a guide member secured to said pan container, a shaft rotatably supported by said pan container, a roller on said shaft rotatable within said pan container and having adhesive gathering grooves on the peripheral surface thereof, a driven sprocket secured to said shaft outside said pan container, electric motor drive means comprising an electric motor having a driving shaft, a driving sprocket secured to said shaft, a platform member supporting said motor, hinge means pivotally connecting said platform member to said frame, and an endless chain connecting said driven and said driving sprocket, said chain being disengageable from said driven and said driving sprockets upon pivotal movement of said platform member around said hinge means, whereby said pan container, said shaft, said roller and said driven sprocket on said shaft, said wiping blade member and said guide member may be removed from said frame as a unit.

References Cited in the file of this patent

UNITED STATES PATENTS

| | | |
|---|---|---|
| 1,472,083 | Osgood | Oct. 30, 1923 |
| 1,654,214 | Evans | Dec. 27, 1927 |
| 2,471,519 | Fitzgerald | May 31, 1949 |
| 2,638,072 | Hollar | May 12, 1953 |